United States Patent [19]
Allison et al.

[11] 3,912,296

[45] Oct. 14, 1975

[54] SHOCK ABSORBER MOUNTING

[75] Inventors: William D. Allison, Grosse Pointe Farms, Mich.; Donald G. Sippel, Basildon, England

[73] Assignee: Ford Motor Company, Dearborn, Mich.

[22] Filed: Dec. 3, 1973

[21] Appl. No.: 421,474

[52] U.S. Cl............................ 280/124 R; 267/19 A
[51] Int. Cl.².......................................... B60G 11/58
[58] Field of Search..... 280/124 R; 267/19 A, 20 A, 267/31, 32, 54 R, 54 C; 188/321

[56] References Cited
UNITED STATES PATENTS

| | | | |
|---|---|---|---|
| 2,576,935 | 12/1951 | Hayes............................... | 280/124 R |
| 3,169,026 | 2/1965 | Soer.................................. | 267/19 A |
| 3,305,245 | 2/1967 | Eidal................................. | 280/124 R |
| 3,575,253 | 4/1971 | Brumm ............................. | 280/124 R |
| 3,612,504 | 10/1971 | Garate .............................. | 280/124 R |

*Primary Examiner*—Philip Goodman
*Assistant Examiner*—John A. Carroll
*Attorney, Agent, or Firm*—Clifford L. Sadler; Keith L. Zerschling

[57] ABSTRACT

The present disclosure relates to a mounting construction for use in connecting a telescopic shock absorber strut to a motor vehicle chassis. The construction includes a pair of spaced apart brackets, one of which is rigidly secured to the shock absorber strut and the other is constructed to be secured to a vehicle chassis component. Rubber elements are interposed between the two brackets and provide a hinge connection therebetween that has a longitudinally extending hinge axis.

7 Claims, 5 Drawing Figures

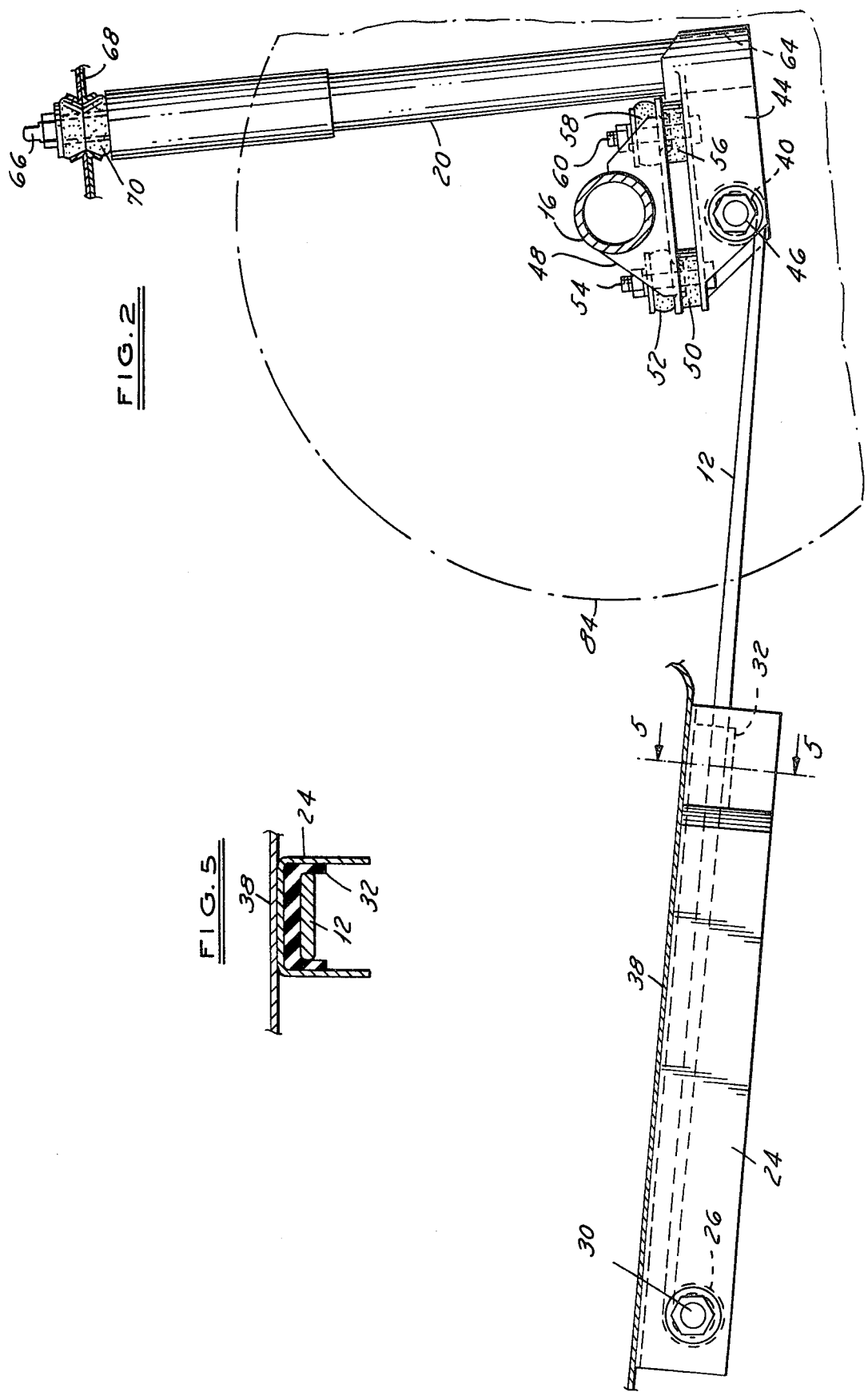

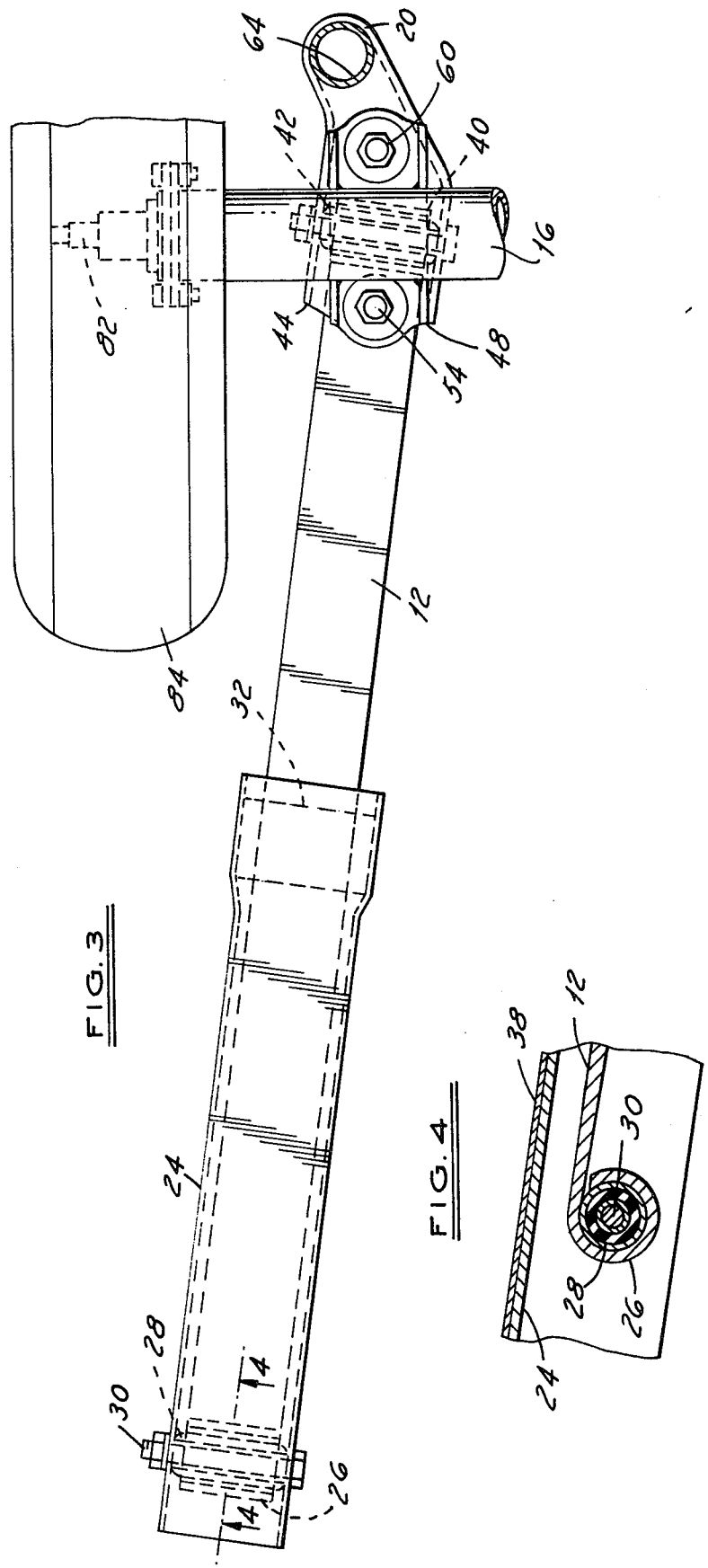

SHOCK ABSORBER MOUNTING

BACKGROUND AND SUMMARY OF THE DISCLOSURE

The present disclosure relates to a mounting construction for use in connecting a telescopic shock absorber strut to a motor vehicle chassis. Conventionally, a motor vehicle shock absorber comprises a telescopic hydraulic damper that has its ends connected to the vehicle body and a wheel support member. Articulated connections are provided at both ends of the shock absorber to permit angular displacement between the shock absorber and the vehicle body and between the shock absorber and the suspension in order to accommodate the vertical jounce and rebound movement of the body with respect to the suspension. With conventional shock absorber mountings, the shock absorber strut is loaded solely in compression or tension.

In accordance with the presently preferred embodiment of this invention, a shock absorber mounting construction is provided to permit bending loads to be transmitted from a wheel support member into the shock absorber strut whereby the strut becomes a reaction member that carries brake torque loads. The shock absorber attachment means of this disclosure permits limited lateral displacement and limited lateral angular displacement of the shock absorber with respect to the wheel support member to which it is connected.

In the embodiment disclosed herein, a telescopic hydraulic shock absorber has its lower end rigidly secured to a first bracket having a flat wall. A second bracket is provided with a flat wall that is spaced apart from the flat wall of the first bracket. A pair of rubber grommets are longitudinally spaced apart and interposed between the flat walls of the two brackets. A second pair of longitudinally spaced apart grommets is positioned on the opposite side of one of the bracket walls and in general alignment with the first pair of grommets. Two threaded fasteners extend through the centers of the grommets and through holes provided in the two brackets.

The second bracket is constructed to be connected to a wheel support member and the interconnection between the two brackets permits a bending load to be imposed upon the shock absorber strut in a vertical plane perpendicular to the axis of the wheel support member. The shock absorber strut mounting permits some lateral displacement of the lower end of the shock absorber with respect to the second bracket and, in addition, permits angular displacement of the shock absorber with respect to the second bracket about a generally longitudinal hinge axis.

BRIEF DESCRIPTION OF THE DRAWINGS

The many objects and advantages of a shock absorber mounting construction in accordance with this invention will become apparent upon consideration of the following detailed description and the accompanying drawings, in which:

FIG. 2 is a side elevational view of the rear suspension and shock absorber mounting of FIG. 1;

FIG. 3 is a top plan view of the right side of the suspension;

FIG. 4 is a sectional view taken along section line 4—4 of FIG. 3; and

FIG. 5 is a sectional view taken along section line 5—5 of FIG. 2.

DETAILED DESCRIPTION OF THE PREFERRED EMBODIMENT

Figure 1:
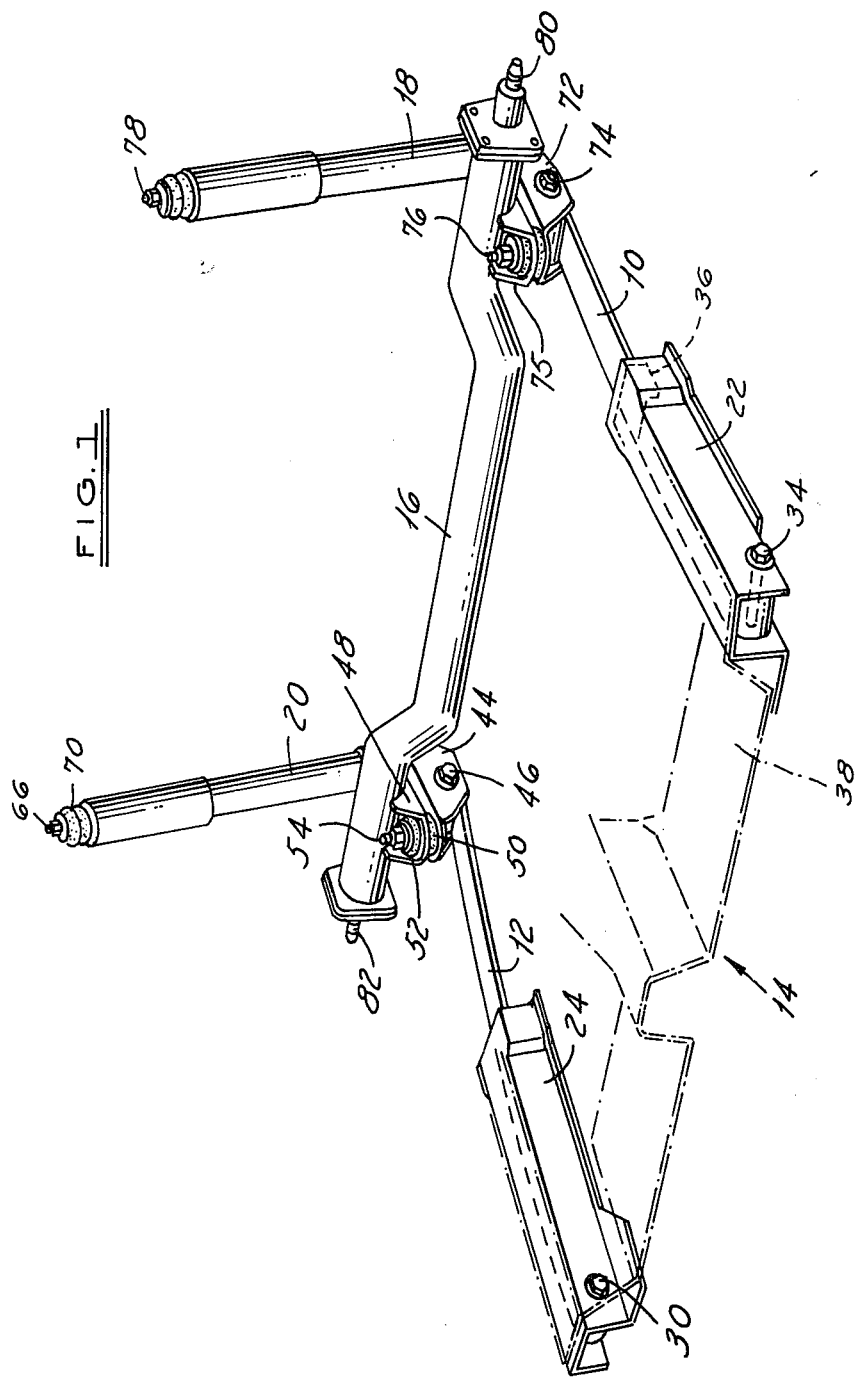
FIG. 1 is a perspective view of a rear suspension system for a motor vehicle embodying the preferred form of the shock absorber mounting construction of this invention.

Referring now to the drawings, wherein the presently preferred embodiment of this invention is shown, FIG. 1 illustrates a rear suspension system for a motor vehicle that incorporates a unique shock absorber mounting construction.

The suspension of FIG. 1 includes left and right cantilever leaf springs 10 and 12 that interconnect a vehicle body 14 and an axle tube 16. A pair of telescopic hydraulic dampers or shock absorber struts 18 and 20 also interconnect the axle tube 16 and the vehicle body 14.

The vehicle body 14 includes left and right channel members 22 and 24 that are situated in the rocker panel areas of the body. The channel members 22 and 24 open downwardly and enclose the forward half of the cantilever leaf springs 10 and 12.

Referring to FIGS. 2 and 3, the channel member 24 is enclosed about the forward half of the leaf spring 12. The forward end of the spring 12 is formed with an eye 26 in which a resilient bushing 28 is positioned. A transverse bolt 30 extends through the bushing 28 and secures a forward end of the spring 12 to the sidewalls of the channel member 24.

A U-shape rubber member 32 (FIG. 5) constitutes a steady rest and is bonded to the upper surface of the leaf spring 12 near its midpoint. The rubber steady rest 32 is interposed between the top and sides of the spring 12 and the top wall and sidewalls of the channel member 24.

The left cantilever spring 10 is similarly connected to the channel member 22. As shown in FIG. 1, a bolt 34 pivotally connects an eye at the forward end of the spring 10 to the sidewalls of the channel member 22. A resilient bushing similar to bushing 28 is interposed between the bolt 34 and the eye at the end of the spring 10. A steady rest 36 provides a support for the channel member 22 on the midportion of the spring 10.

A sheet metal member 38, which forms a floor of the vehicle body, extends between the channel members 22 and 24.

Resilient pivot means are provided for connecting the rearward ends of the leaf springs 10 and 12 to the axle tube 16. The rearward end of the spring 12 is formed with an eye 40 similar in construction to the eye 26. A resilient bushing 42 is positioned in the eye 40. The eye 40 and bushing 42 are situated between the sidewalls of a generally channel shape bracket 44. A bolt 46 extends through the sidewalls of the bracket 44 and connects the bushing 42 and eye 40 to the bracket.

A bracket 48 is welded to the axle tube 16 adjacent its right end. Two pairs of resilient grommets are provided to connect the bracket 44 to the axle bracket 48. A first pair of grommets 50 and 52 is situated at the forward end of the brackets 44 and 48. A threaded fastener 54 extends through appropriate holes in the brackets 44, 48 and through the centers of the grommets 50, 52. In a similar fashion, a pair of grommets 56 and 58 is secured to the brackets 44, 48 by a threaded fastener 60.

With this construction, the brackets 44 and 48 are combined to form a two-piece bracket assembly. The rubber grommets 50, 52, 56 and 58 provide a hinge having a longitudinal axis between the brackets 44 and 48.

The telescopic shock absorber strut 20 has its pressure tube portion fitted into and rigidly secured to a socket portion 64 formed in the bracket 44. The extending piston rod end 66 of the shock absorber strut 20 is connected to body sheet metal 68 by a conventional rubber grommet construction 70.

In a similar fashion, the left leaf spring 10 is connected to the channel shape bracket 72 by means of a bolt 74 that passes through a resilient bushing contained within an eye formed at the rearward end of the spring 10. A channel shape bracket 75 is welded to the outer end of the axle tube 16. The brackets 72 and 75 are connected by two pairs of rubber grommets (similar to the rubber grommets 50, 52, 56 and 58) and appropriate fasteners. A threaded fastener 76 passes through one of the pair of grommets.

The left shock absorber strut 18 has its lower end rigidly secured to the bracket 72. The end of the piston rod 78 of the shock absorber strut 18 is connected to a sheet metal panel of the vehicle body 14.

In the illustrated embodiment of the invention, the axle tube 16 supports spindle members 80 and 82 at its left and right ends. The spindles 80 and 82, in turn, rotatably support a pair of rear vehicle wheels such as the right rear wheel and tire assembly 84 shown in FIGS. 2 and 3.

In the illustrated embodiment of the invention, the suspension is intended for a front wheel drive vehicle. The axle tube 16 is a dead axle and the rear wheels are rotatably supported on the spindles 80 and 82. It should be understood, however, that the suspension of the present invention is equally adaptable to a live or driven rear axle.

OPERATION

The cantilever springs 10 and 12, in combination with the manner in which they are supported in the channel members 22 and 24, provide four major functions. The springs 10, 12 operate to (1) transmit load and spring rate to the rear wheels; (2) locate the axle longitudinally; (3) locate the axle transversely with a selected rate of lateral compliance; and (4) provide desired roll and compliance steer effects.

The resilient mounts between the brackets 48, 75 that are rigid with the rear axle tube 16 and the brackets 44, 72 that are rigid with the base of the shock absorber struts 18 and 20 provide a means for tuning the rear axles for a desired limited rate of torsional windup. Selection of the rubber grommets with the appropriate hardness will provide the desired rate. This is especially important for rear drive vehicles. This construction also improves braking with front drive vehicles.

The resilient connections between the brackets 44, 48 and between the brackets 72, 75 serve as flexible hinges for lateral movement for the upper pivots of the struts 18, 20 during body roll or nonparallel axle translation.

Side forces from the sprung to the unsprung mass are transmitted at the midpoint of the resilient mounts connecting the axle brackets 48, 75 to brackets 44, 72 which are connected to the springs 10, 12 and struts 18, 20. The resiliency of the mounts permits lateral compliance of the body with respect to the axle 16. Favorable ride and handling characteristics will result from such compliance.

The weight of the vehicle body is supported on the axle tube 16 by the springs 10 and 12 through the rubber steady rests 32 and 36 and the resilient bushings at the forward ends of the springs. During braking, rotation of the axle 16 is resisted by the struts 18 and 20 which are rigidly secured to the brackets 72 and 44.

Depending upon the direction of wheel rotation when the wheel brakes are applied, different ones of the grommets are loaded in compression. At the same time, certain ones of the threaded fasteners will be loaded in tension. These elements function to transmit the braking load from the axle 16 to the struts 18 and 20. For an example, when the wheel 84 is rotating in the forward direction (counterclockwise in FIG. 2) and the brakes are applied, grommets 50 and 58 will be loaded in compression and the bolt 60 will be loaded in tension.

Jounce and rebound stops are constructed into the shock absorber struts 18 and 20. When the struts 18 and 20 are fully extended during extreme rebound, the resilient elements 36 and 32 will remain in full engagement with both the leaf springs 10, 12 and the channel members 22, 24.

The foregoing description presents the presently preferred embodiment of this invention. Modifications and alterations may occur to those skilled in the art that will come within the scope and spirit of the following claims.

What is claimed is:

1. A shock absorber mounting comprising:
a telescopic shock absorber strut constructed for use in a motor vehicle,
a first bracket rigidly secured to one end of said strut,
a second bracket constructed to be connected to a vehicle chassis component,
pivot means interconnecting said first and second brackets,
said means having a pivot axis arranged generally longitudinal relative to the longitudinal axis of said vehicle,
said second bracket being connected to a wheel support member constructed to support a vehicle wheel,
said pivot axis of said means being disposed in a vertical plane arranged generally perpendicular to the axis of said wheel support member.

2. A shock absorber mounting comprising:
a telescopic shock absorber strut constructed for use in a motor vehicle,
a bracket rigidly secured to one end of said strut,
wheel support means constructed to support a vehicle wheel,
resilient pivot means interconnecting said bracket and said wheel support means,
said pivot means having a pivot axis situated in a vertical plane that is generally perpendicular to said axis of said wheel support means.

3. A shock absorber mounting comprising:
an elongated telescopic shock absorber strut constructed for use in a motor vehicle,
a first bracket rigidly secured to one end of said strut,
a second bracket constructed to be connected to a vehicle wheel support member, said first and second brackets having spaced apart horizontal walls, first and second elastomeric grommets interposed between said horizontal walls, said first and second grommets being spaced apart, third and fourth elastomeric grommets coaxially arranged relative to said first and third grommets, respectively, first threaded fastening means extending through said first and third grommets and constructed to connect said first bracket to said second bracket, second threaded fastening means extending through said second and fourth grommets and constructed to connect said first bracket to said second bracket.

4. A shock absorber mounting according to claim 3 and including:

the centers of said grommets lying in a vertical plane arranged perpendicular to the axis of said wheel support member.

5. A shock absorber mounting according to claim 3 and including:

said first threaded fastening means being located generally intermediate said second threaded fastening means and said strut.

6. A shock absorber mounting according to claim 3 and including:

said first threaded fastening means being located generally intermediate said second threaded fastening means and said strut, the centers of said grommets lying in a vertical plane arranged perpendicular to the axis of said wheel support member.

7. A shock absorber mounting comprising:

an elongated telescopic shock absorber strut constructed for use in a motor vehicle, a first bracket having a cylindrical socket, said one end of said strut being rigidly received in said socket, a second bracket constructed to be connected to a vehicle wheel support member, said first and second brackets having spaced apart horizontal walls, first and second elastomeric grommets interposed between said horizontal walls, said first and second grommets being spaced apart, third and fourth elastomeric grommets coaxially arranged relative to said first and third grommets, respectively, the centers of said grommets lying in a vertical plane arranged perpendicular to the axis of said wheel support member, first threaded fastening means extending through said first and third grommets and constructed to connect said first bracket to said second bracket, second threaded fastening means extending through said second and fourth grommets and constructed to connect said first bracket to said second bracket, said first threaded fastening means being located generally intermediate said second threaded fastening means and said socket.

* * * * *